US011349923B2

United States Patent
Cook et al.

(10) Patent No.: US 11,349,923 B2
(45) Date of Patent: May 31, 2022

(54) PERSISTENT VOLUMES FOR STATEFUL APPLICATIONS

(71) Applicant: salesforce.com, inc., San Francisco, CA (US)

(72) Inventors: Casey Cook, Redwood City, CA (US); Mingliang Sun, Fremont, CA (US); Anurag Bhatt, Brampton (CA); Jonathan Barthelemy, San Francisco, CA (US); Wei Feng, Fremont, CA (US); Krishnakumar Sivashanmugam, Dublin, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/750,193

(22) Filed: Jan. 23, 2020

(65) Prior Publication Data

US 2021/0234925 A1    Jul. 29, 2021

(51) Int. Cl.
*H04L 67/1097*  (2022.01)
*G06F 3/06*  (2006.01)
*H04L 47/70*  (2022.01)
*G06Q 10/06*  (2012.01)
*G06Q 30/00*  (2012.01)

(52) U.S. Cl.
CPC ........ *H04L 67/1097* (2013.01); *G06F 3/0604* (2013.01); *G06F 3/067* (2013.01); *G06F 3/0644* (2013.01); *H04L 47/82* (2013.01); *G06Q 10/0631* (2013.01); *G06Q 30/016* (2013.01)

(58) Field of Classification Search
CPC ... H04L 67/1097; H04L 47/82; G06F 3/0604; G06F 3/0644; G06F 3/067; G06Q 10/0631; G06Q 30/016
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |

(Continued)

*Primary Examiner* — Jonathan A Bui
*Assistant Examiner* — Zonghua Du
(74) *Attorney, Agent, or Firm* — Dergosits & Noah LLP; Todd A. Noah

(57) ABSTRACT

Systems and methods for implementing stateful services using cloud-based resources are described. A server computing system determines existence of a first volume based on a launch of a first instance by an auto-scaling group (ASG). The first volume is to have a resource tag having a value similar to a value of a resource tag of the ASG. The first volume was previously attached to a second instance terminated by the ASG. Based on a successful determination of the existence of the first volume, the server computing system attaches the first volume to the first instance. Based on a failed determination of the existence of the first volume, the server computing system generates a second volume, attaches the second volume to the first instance, and set a resource tag of the second volume to a value similar to the value of the resource tag of the ASG.

21 Claims, 12 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,779,431 B1 * | 10/2017 | Sahay ................ G06Q 30/04 |
| 10,360,614 B1 * | 7/2019 | Rifkin ............ G06Q 30/0631 |
| 10,496,692 B1 * | 12/2019 | Kahrs ................ G06F 16/955 |
| 10,791,021 B1 * | 9/2020 | Sharma ............. H04L 41/0803 |
| 10,880,232 B1 * | 12/2020 | Goodman ............. G06F 16/29 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Bames-Leon et al. |
| 2004/0199536 A1 | 10/2004 | Bames-Leon et al. |
| 2004/0249854 A1 | 12/2004 | Bames-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0359537 A1 | 12/2014 | Jakobsen et al. |
| 2015/0007050 A1 | 1/2015 | Jakobsen et al. |
| 2015/0095162 A1 | 4/2015 | Jakobson et al. |
| 2015/0172563 A1 | 6/2015 | Jakobson et al. |
| 2016/0117107 A1 * | 4/2016 | Ahuja ................. G06F 3/0604 |
| | | 711/114 |
| 2018/0267785 A1 * | 9/2018 | Holman ................. G06F 8/60 |
| 2019/0065323 A1 * | 2/2019 | Dhamdhere ........ G06F 11/3452 |
| 2020/0012443 A1 * | 1/2020 | Chen ................... G06F 3/0629 |
| 2020/0387357 A1 * | 12/2020 | Mathon ............... G06F 9/5077 |
| 2021/0044504 A1 * | 2/2021 | Verma ................ H04L 67/325 |

* cited by examiner

US 11,349,923 B2

PERSISTENT VOLUMES FOR STATEFUL APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to enabling stateful services in a cloud environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Stateful services generally require the ability to store information such that the state of the services can be preserved in case the stateful service needs to be taken down and restarted. This may be difficult to implement in the cloud environment when virtual storage devices associate with a virtual server are normally destroyed when the virtual server terminates. Current approaches to enable stateful services require lots of overhead and are inefficient.

BRIEF SUMMARY

For some embodiments, systems and methods for implementing stateful services using cloud-based resources may include determining, by a server computing system, existence of a first volume based on a launch of a first instance by an auto-scaling group (ASG), the first volume configured to have a resource tag having a value similar to a value of a resource tag of the ASG, wherein the first volume was previously attached to a second instance terminated by the ASG, and wherein the value of the resource tag of the ASG is associated with a stateful service; based on a successful determination of the existence of the first volume, attaching, by the server computing system, the first volume to the first instance; and based on a failed determination of the existence of the first volume: generating, by the server computing system, a second volume; attaching, by the server computing system, the second volume to the first instance; and setting a resource tag of the second volume to a value similar to the value of the resource tag of the ASG. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
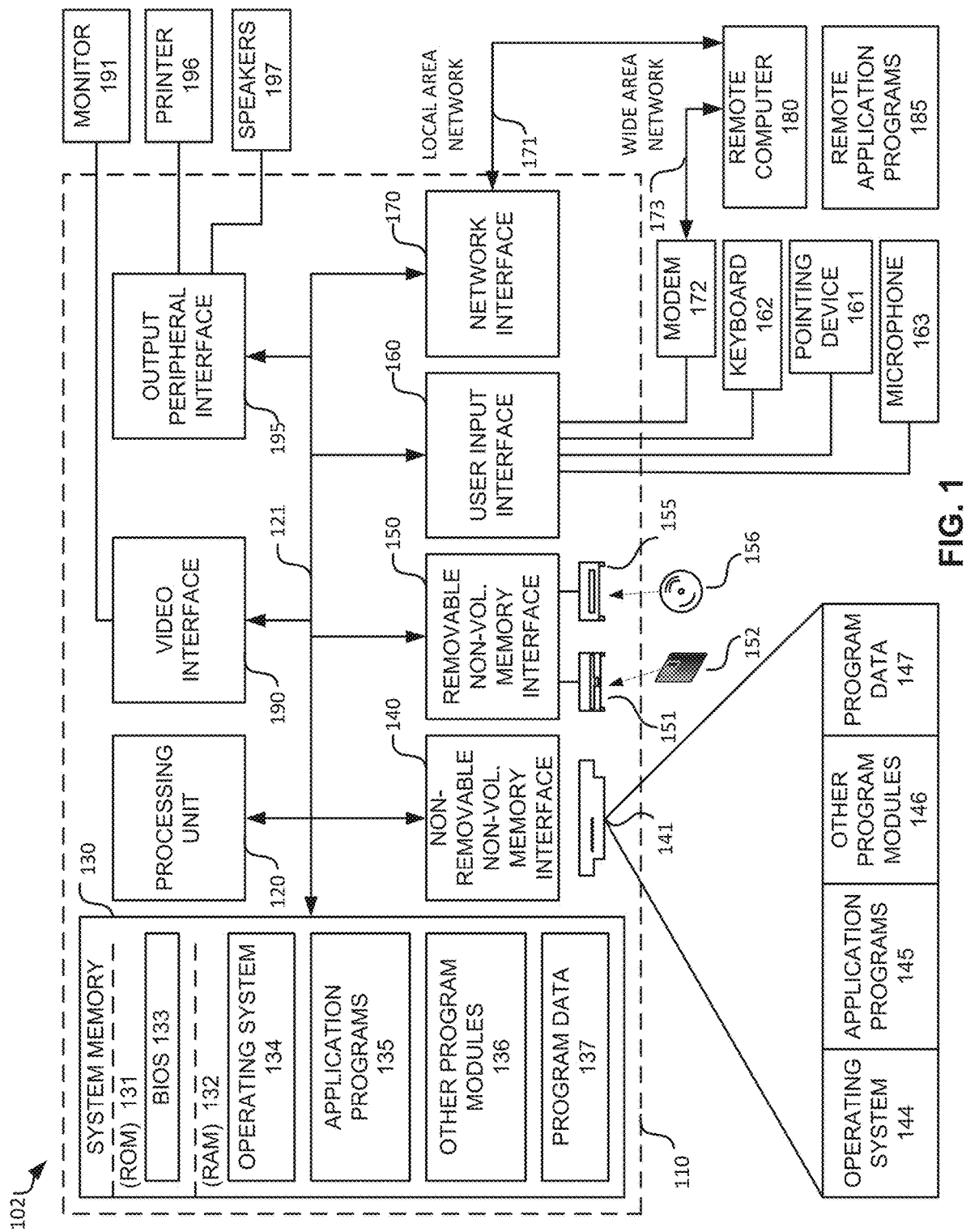
FIG. 1 shows a diagram of an example computing system that may be used with some embodiments.

Systems and methods for implementing stateful services using cloud-based resources may comprise using resource tags to associate existing volumes with instances launched by an auto-scaling group (ASG). An existing volume may be attached to an instance based on a resource tag of the existing volume having a value similar to a value of a resource tag of the ASG. The existing volume is configured to be persistent such that termination of an instance that the existing volume is attached to does not cause the existing volume to be destroyed thus preserving its content for the stateful service.

The systems and methods associated with implementing stateful services using cloud-based resources will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a method for implementing stateful services using cloud-based resources and may include determining, by a server computing system, existence of a first volume based on a launch of a first instance by an auto-scaling group (ASG), the first volume configured to have a resource tag having a value similar to a value of a resource tag of the ASG, wherein the first volume was previously attached to a second instance terminated by the ASG, and wherein the value of the resource tag of the ASG is associated with a stateful service; based on a successful determination of the existence of the first volume, attaching, by the server computing system, the first volume to the first instance; and based on a failed determination of the existence of the first volume: generating, by the server computing system, a second volume; attaching, by the server computing system, the second volume to the first instance; and setting a resource tag of the second volume to have a value similar to the value of the resource tag of the ASG.

The disclosed embodiments may include a system for implementing stateful services and may include one or more processors, and a non-transitory computer readable medium storing a plurality of instructions, which when executed, cause the one or more processors of a server computing system to determine existence of a first volume based on a launch of a first instance by an auto-scaling group (ASG), the first volume configured to have a resource tag having a value similar to a value of a resource tag of the ASG, wherein the first volume was previously attached to a second instance terminated by the ASG, and wherein the value of the resource tag of the ASG is associated with a stateful service; based on a successful determination of the existence of the first volume, attach the first volume to the first instance; and based on a failed determination of the existence of the first volume: generate a second volume; attach the second volume to the first instance; and set a resource tag of the second volume to have a value similar to the value of the resource tag of the ASG.

The disclosed embodiments may include a computer program product comprising computer-readable program code to be executed by one or more processors of a server computing system when retrieved from a non-transitory computer-readable medium, the program code including instructions to determine existence of a first volume based on a launch of a first instance by an auto-scaling group (ASG), the first volume configured to have a resource tag having a value similar to a value of a resource tag of the ASG, wherein the first volume was previously attached to a second instance terminated by the ASG, and wherein the value of the resource tag of the ASG is associated with a stateful service; based on a successful determination of the existence of the first volume, attach the first volume to the first instance; and based on a failed determination of the existence of the first volume: generate a second volume; attach the second volume to the first instance; and set a resource tag of the second volume to have a value similar to the value of the resource tag of the ASG.

While one or more implementations and techniques are described with reference to an embodiment relating to implementing stateful services using cloud-based resources implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed. Further, some embodiments may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Some embodiments of the present invention may include methods and systems for implementing stateful services. The methods and systems may enable using resource tags to locate existing persistent volumes to attach to an instance associated with a stateful service. The methods and system may also enable generating an updated machine image and enabling the updated machine image to be used to launch instances associated with the stateful service.

FIG. 1 is a diagram of an example computing system that may be used with some embodiments of the present invention. In diagram 102, computing system 110 may be used by a user to establish a connection with a server computing system. For example, the user may be associated with a stateful service that includes applications running on a server computing system, and the applications may need to store data in one or more databases. The server computing system and the one or more databases may be implemented using cloud-based resources.

The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
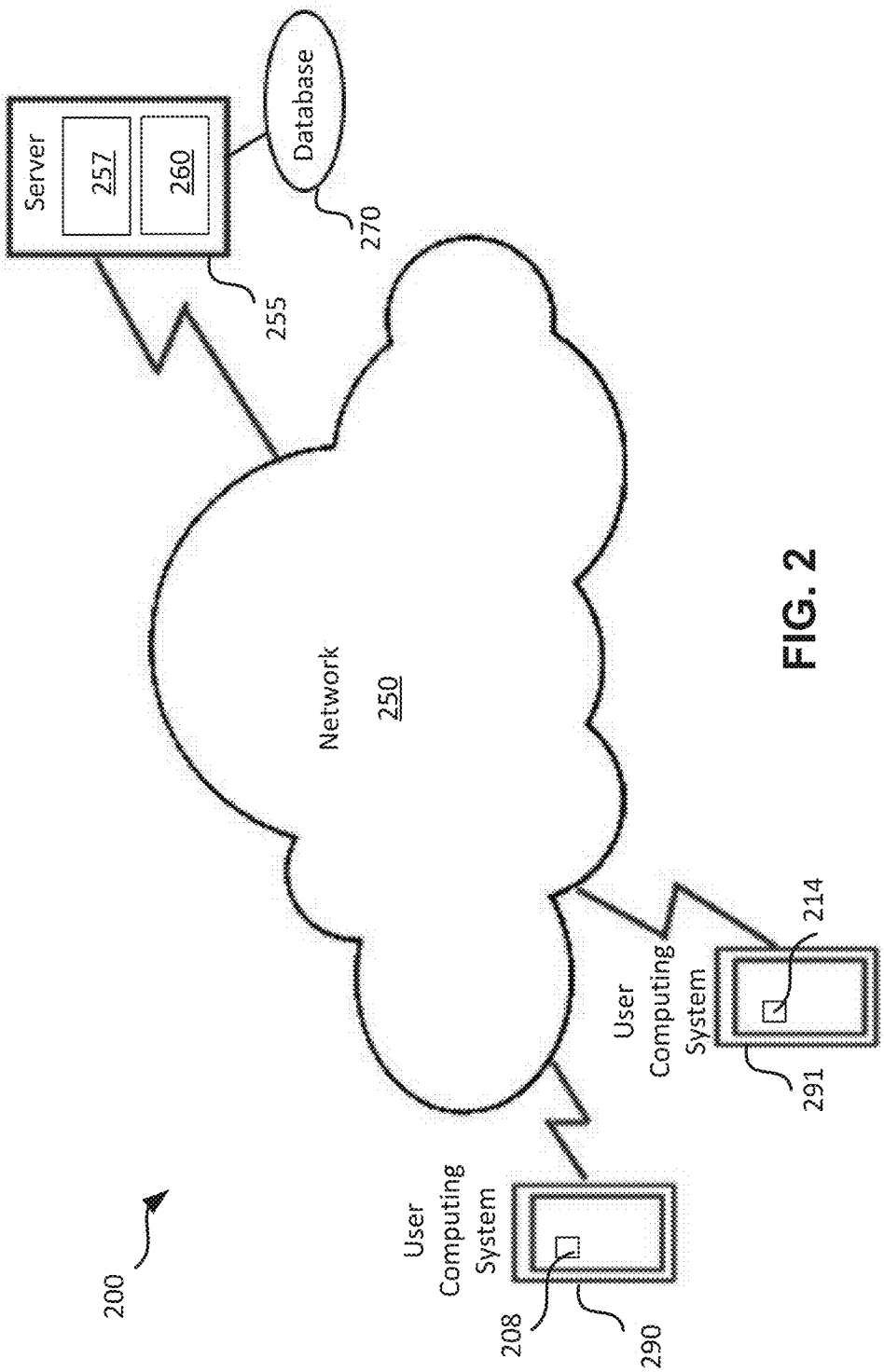
FIG. 2 shows a diagram of an example network environment that may be used with some embodiments.

FIG. 2 shows a diagram of an example network environment that may be used with some embodiments of the present invention. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270.

Each of the computing systems 290 and 291 may include an application module such as module 208 or 214. For example, a user may use the computing system 290 and the application module 208 to connect to and communicate with the server computing system 255 and log into application 257 (e.g., a Salesforce.com® application). For some embodiments, the server computing system 255 may be a cloud-based server (or virtual server) and the database 270 may be included in a persistent cloud-based storage (or volume).

Figure 3:
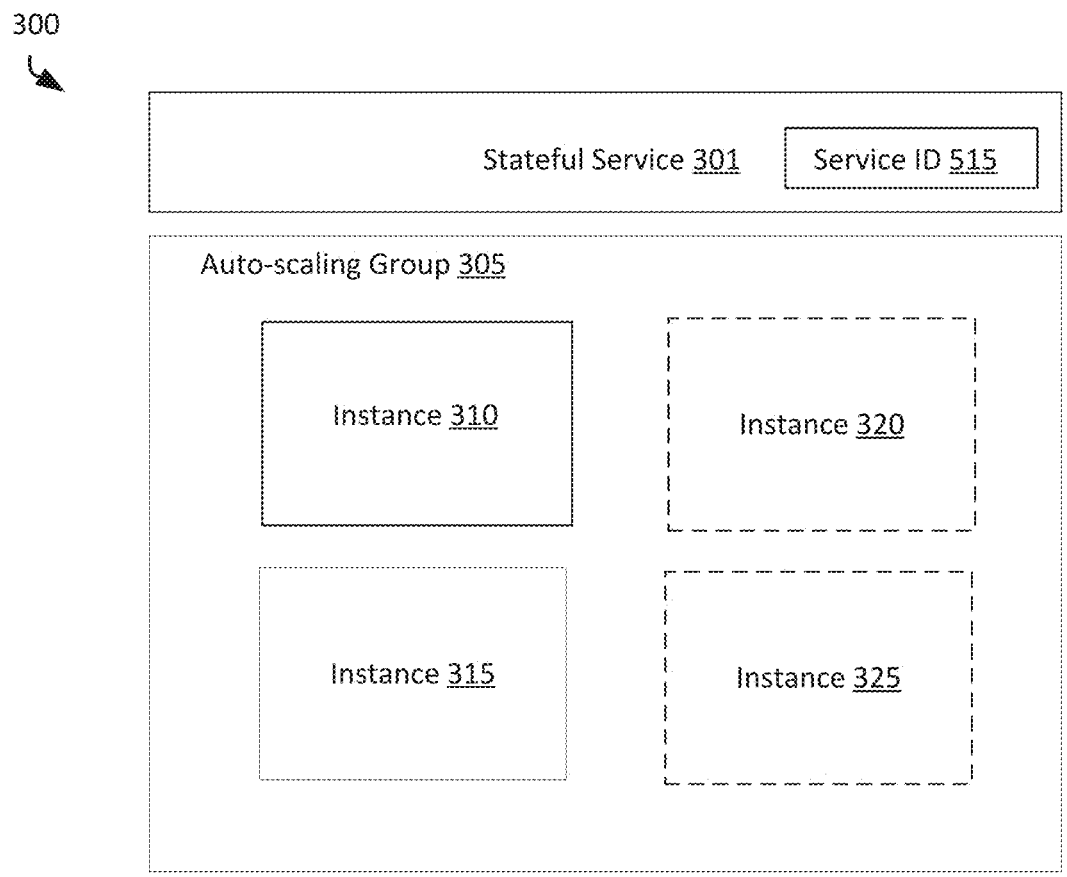
FIG. 3 shows an example diagram that includes a stateful service and an auto-scaling group associated with the stateful service, in accordance with some embodiments.

FIG. 3 shows an example diagram that includes a stateful service and an auto-scaling group associated with the stateful service, in accordance with some embodiments. In diagram 300, stateful service 301 may be a service that requires the data it generates to be stored in a persistent storage such that the data is not lost if the stateful service 301 is terminated. When the stateful service 301 is restarted, the stateful service 301 may continue its operation using the data stored in the persistent storage and may behave as if the termination did not occur. The stateful service 301 may be associated with a stateful application. An example of a stateful application is a database application such as MySQL application, which is an open-source database application developed by Oracle Corporation of Redwood City, Calif. The data stored in the persistent storage by the stateful application may be referred to as stateful data.

In contrast, non-stateful (or stateless) service (not shown) may be a service that is not configured to store data that it generates such that loss of the data due to termination of the stateless service does not affect the stateless service when it is subsequently restarted. Each time a stateless service is started, the stateless service may be viewed as being started for the first time, even though the stateless service may have been started and terminated previously. A stateless service may be associated with a stateless application. A simple example of a stateless application is a calculator application. Each time it is started, it always displays a zero with no memory of any previous calculations.

The stateful service 301 may be configured to operate in a cloud environment using cloud-based resources such as, for example, cloud-based computing and cloud-based storage. With cloud-based computing, the stateful service 301 may be associated with one or more virtual servers (also referred to as instances). For example, Amazon's Elastic Compute Cloud (EC2) instance is a virtual server configured for running applications on the Amazon Web Services (AWS) infrastructure. AWS is a product of Amazon, Inc. of Seattle, Wash. The stateful service 301 may be assigned a unique service identification (ID) 515 (described with FIG. 5A).

For some embodiments, the stateful service 301 may be associated with auto-scaling group 305 configured to launch and terminate instances automatically. The auto-scaling group 305 may be configured with a scaling policy to launch or terminate the instances in the group to meet changing conditions of the stateful service 301. For example, the scaling policy may indicate a minimum number of instances "x" (e.g., x=1), a maximum number of instances "y" (e.g., y=4), and a desired number of instances "z" (e.g., z=2). As shown in FIG. 3, the auto-scaling group 305 may include a maximum of four instances 310-325. The instances 310 and 315 may be active while the instances 320 and 325 (shown in dashed lines) may have been terminated.

Each instance in the auto-scaling group (ASG) may be associated with an instance ID and an availability zone. Availability zones are isolated locations within data center regions from which public cloud services originate and operate. For some embodiments, the instances in an ASG are local to an availability zone. There may be multiple ASGs associated with different availability zones. This may help providing some level of fault tolerance. The ASG 305 may help ensuring that a correct number of instances is available to handle the load for the application associated with the stateful service 301.

Figure 4A:
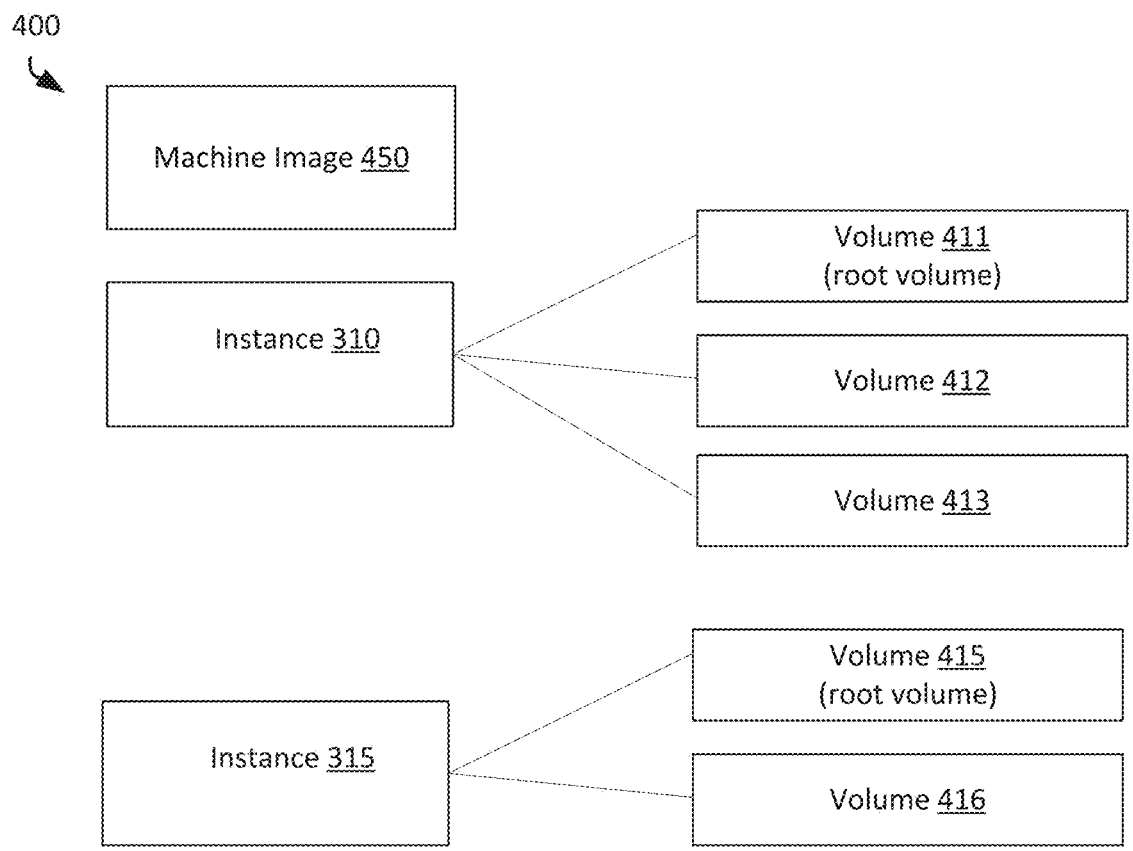
FIG. 4A shows an example diagram of a machine image, an instance and the volumes that the instance is attached to, in accordance with some embodiments.

FIG. 4A shows an example diagram of a machine image, an instance and the volumes that are attached to the instance, in accordance with some embodiments. When configuring the ASG 305, it may be necessary to specify information about a machine image for the ASG 305 to use to launch an instance. Machine image 450 shown in diagram 400 may include operating system (OS) information to identify an OS used to run with the instance 310. When using the AWS infrastructure, the machine image 450 is referred to as Amazon Machine Image (AMI). Using the AMI example, an AMI may include a pointer to an OS that is maintained by Amazon and its partners (e.g., Red Hat, Microsoft). A user may select an AMI provided by Amazon or its partners, or the user may select an AMI that the user has created from a running or stopped instance.

The machine image 450 may also include block device mapping. A block device mapping defines the block devices (e.g., volumes) to attach to an instance. For example, a block device mapping can be included as part of creating an AMI so that the mapping is used by all instances launched from the AMI. Alternatively, a block device mapping can be specified when an instance is launched such that this mapping overrides the mapping specified in the AMI from which an instance is launched. A volume may be created from a volume snapshot (backup of an individual volume). When using the AWS infrastructure, a volume may be referred to as Elastic Block Store (EBS) volume.

A volume may be attached to only one instance, while multiple volumes may be attached to the same instance. As shown in FIG. 4A, the instance 310 may be attached to three volumes 411-413, and the instance 311 may be attached to two volumes 415-416. One of the volumes that an instance is attached to may be referred to as a root volume (e.g., volume 411 and volume 415). The root volume is formed when an instance is launched. The root volume may be configured to contain the image used to boot the instance. The block device mapping may be used to specify additional volumes (e.g., volumes 412-413 or volume 416) to attach to an instance when the instance is launched.

Figure 4B:
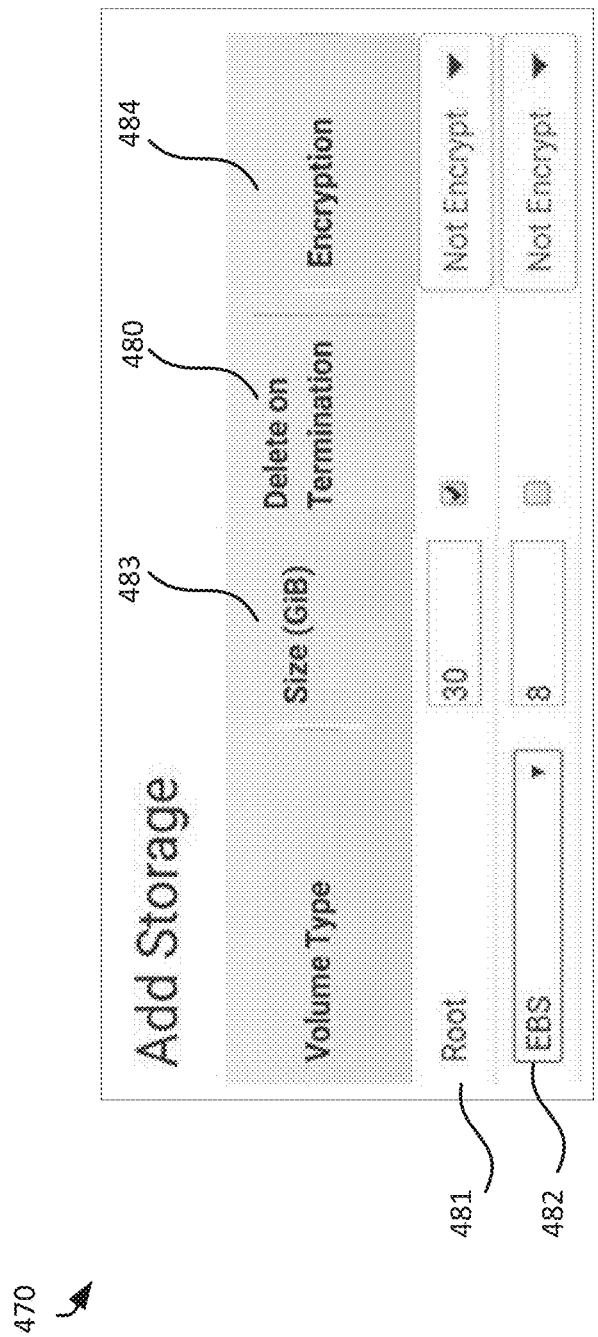
FIG. 4B shows an example diagram of a user interface for configuring a volume, in accordance with some embodiments.

FIG. 4B shows an example diagram of a user interface for configuring a volume, in accordance with some embodiments. Diagram 470 shows an interface to add storage and includes configuration for a root volume 481 and a non-root volume 482 with size option 483 and encryption option 484. By default, the root volume 481 for an AMI backed by Amazon EBS is deleted when the instance terminates. Similarly, the non-root volume 482 may be deleted when the instance that it attaches to terminates, and the data stores in the non-root volume 482 may be lost.

For some embodiments, the volumes that are attached to an instance may be designated as persistent volumes such that the data stored in these volumes may not be lost when the instance they are attached to terminates. Using the AWS infrastructure example, when an instance terminates, Amazon Elastic Compute Cloud (Amazon EC2) evaluates the value of the "DeleteOnTermination" option 480 for each attached EBS volume to determine whether to preserve or delete the volume. For example, to keep a volume persistent, the "DeleteOnTermination" attribute 480 for that volume may need to be set to false. A persistent volume that was attached to an instance that terminated may be resurrected by being attached to a new instance when the new instance is launched by the ASG 305. The setting of the "DeleteOnTermination" option 480 may also be applicable for the root volume 411. It may be noted that a user can use the interface shown in diagram 470 to add multiple volumes to attach to the instance. As such, when the instance is launched, the number of volumes the instance is associated with may be known by the startup script 510 (shown in FIG. 5A).

Each of the resources associated with the AWS infrastructure may be assigned a resource tag. A resource tag may consist of a key and a value that a user can define. A resource may have multiple resource tags. A resource tag may be used to categorize the resources in different ways such as, for example, by purpose, owner, environment, or by service type. This may be useful to quickly identify a specific resource based on the resource tag when there are many resources of the same type. For example, the ASG 305 may be assigned a resource tag having a key as "stateful service" and a value that is the same as the service ID assigned to the stateful service 301. Similarly, each of the volumes attached to an instance may be assigned a resource tag having a key as "stateful service" and a value that is the same as the service ID assigned to the stateful service 301.

Figure 5A:
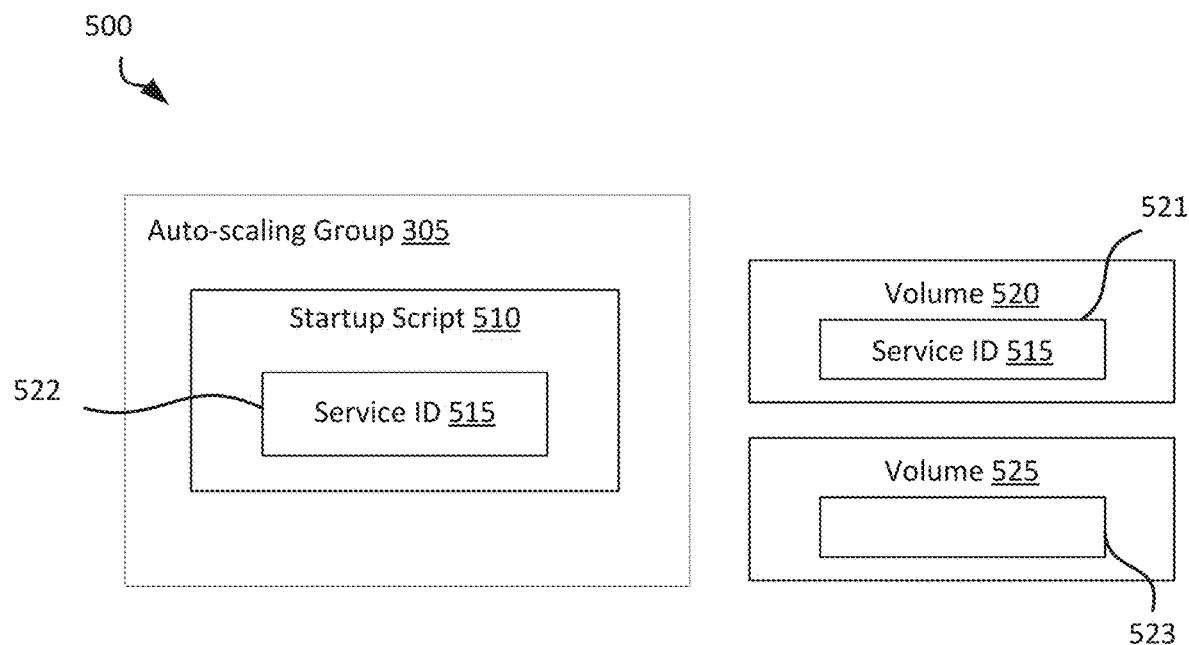
FIG. 5A shows an example diagram of a startup script, in accordance with some embodiments.

FIG. 5A shows an example diagram of a startup script, in accordance with some embodiments. In this example, the volume 520 may be an existing volume, while the volume 525 may be a new volume. When configuring the auto-scaling group 305, it may be possible to add a startup script 510 such that that startup script 510 executes on startup of each instance. For some embodiment, the startup script 510 may be configured to be aware of the resource tag 522 of the ASG 305 and the value associated with the resource tag 522. For some embodiments, the value associated with the resource tag 522 is set to be similar to the service ID 515 of the stateful service 301. The startup script 510 may also be aware that each volume that is attached to an instance is configured to have a resource tag, and the startup script 510 expects the resource tag of an existing volume to have a value that is similar to the value of the resource tag 522 associated with the ASG 305. Further, the startup script 510 may be aware of the number of volumes that is supposed to be attached to the instance, as described with FIG. 4B.

The startup script 510 may be configured to locate and attach one or more persistent volumes to an instance. It may be noted that a persistent volume may not exist when the auto-scaling group 305 (or the stateful service 301) starts for the first time. When the service 301 starts for the first time, the non-root volumes that are attached to an instance launched by the ASG 305 may be empty. When the service 301 re-starts after having started previously, it may be possible that the non-root volumes that are attached to an instance launched by the ASG 305 may not be empty. Referring to FIG. 5A, the volume 520 is illustrated as a non-empty existing volume, while the volume 525 is illustrated as a new empty volume.

For some embodiments, the startup script 510 may be configured to locate any existing volumes that have resource tags (e.g., resource tag 521) having values similar to the value of the resource tag associated with the ASG 305. When the startup script 510 is able to locate an existing volume (e.g., volume 520), that volume may be resurrected by being attached to the new instance. However, when the startup script 510 is not able to locate any volume having a resource tag with value similar to the service ID 515, the startup script 510 may cause a new volume (e.g., volume 525) to be generated. The resource tag 523 of the new volume may be assigned a value similar to the value of the resource tag 522 associated with the ASG 305. The new volume 525 may then be attached to the new instance.

As mentioned, the startup script 510 is configured to be aware of the number of volumes (e.g., four) that are to be attached to an instance. It may be possible that the number of existing volumes (e.g., three) that the startup script 510 is able to locate is less than the number of volumes to be attached to an instance. In such situation, the startup script 510 may generate the additional volumes. Based on the above discussions, it may be possible for the stateful service 301 to be taken down and brought back with a different set of instances but still with the same volumes by referencing the values of the resource tags of the existing volumes.

Figure 5B:
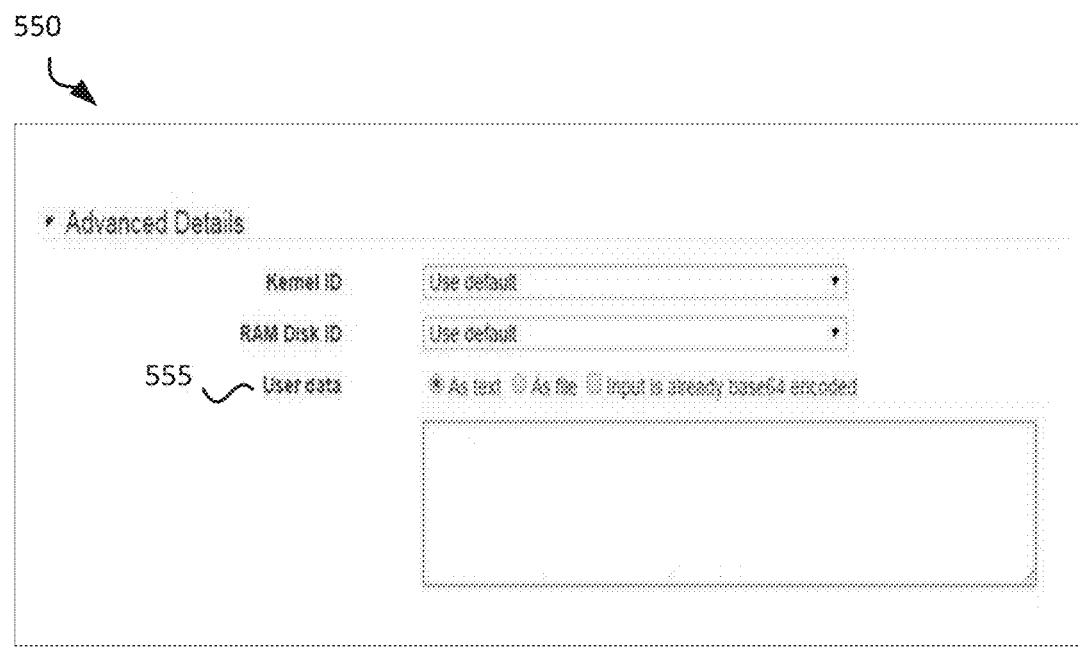
FIG. 5B shows an example diagram of an auto-scaling group configuration interface, in accordance with some embodiments.

FIG. 5B shows an example diagram of an auto-scaling group configuration interface, in accordance with some embodiments. The auto-scaling group configuration interface 550 is associated with the AWS infrastructure and includes a user data section 555. For some embodiments, the startup script 510 may be entered as input to the user data section 555 for execution when an instance is launched.

Figure 5C:
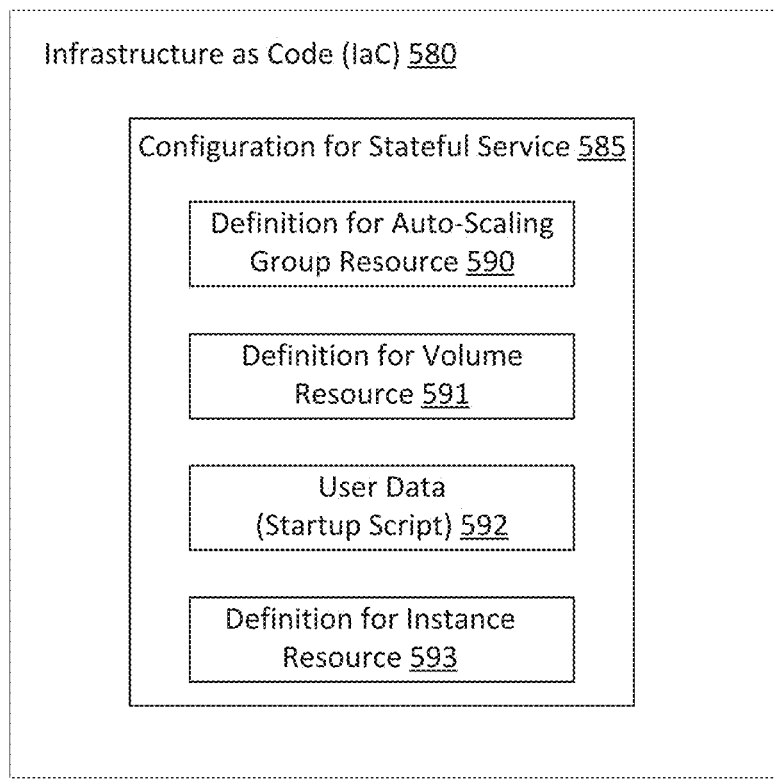
FIG. 5C shows an example diagram of Infrastructure as Code (IaC), in accordance with some embodiments.

FIG. 5C shows an example diagram of Infrastructure as Code (IaC), in accordance with some embodiments. Infrastructure as Code (IaC) 580 may be used to provision and manage the cloud-based resources necessary to implement a stateful service described above. Using the IaC 580, an infrastructure may be described using a high-level configuration syntax. This allows a blueprint of a datacenter to be versioned and treated as any other code. Additionally, infrastructure can be shared and re-used. Describing the infrastructure using code may be more efficient than manually creating those resources via an interface such as, for example, Amazon ASG interface (shown in FIG. 5B).

With the IaC 580, a human-readable template file can be written to define the resources of the infrastructure. One example of the IaC 580 is Terraform, an open-source infrastructure as code software tool created by HashiCorp of San Francisco, Calif. Terraform is a general orchestration tool that can interface with a number of different cloud infrastructures including AWS infrastructure. For example, Terraform includes AWS provider that can be used to interact with the many resources supported by AWS. The AWS provider needs to be configured with the proper credentials before it can be used.

Using Terraform, a user may write a configuration file 585 on the user's computer and declare the elements or resources of the infrastructure (e.g., AWS) that the user wants to create. The configuration file 585 may then be submitted and run by Terraform to generate the corresponding infrastructure.

Terraform's configuration files can be written in either the HashiCorp Configuration Language (HCL), or in JavaScript Object Notation (JSON). HCL is a configuration language designed to be human readable and machine friendly. With each infrastructure, Terraform provides a set of resource keywords to define the resources associated with that infrastructure. For example, there may be resource keywords for the auto-scaling group 305, the volumes 411-413, and the startup script 510. Terraform also provides a set of data source keywords to retrieve definition of an existing resource. For example, there may be a data source keyword to retrieve information (e.g., value of a resource tag) about an existing volume.

Using Terraform support for the AWS infrastructure, the resource keyword for an autoscaling group is "aws_autoscaling_group". Each resource keyword may be associated with one or more arguments. For example, the resource keyword "aws_autoscaling_group" may be associated with the arguments "max_size" for maximum number of instances, "min_size" for minimum of instances, and "desired_capacity" for desired number of instances, as described with FIG. 3. Using the resource keyword "aws_autoscaling_group", one or more ASG may be generated, each with multiple instances. Following is an example of using Terraform to generate definition for an ASG resource 590 using the resource keyword "aws_autoscaling_group". The scaling criteria include minimum of 2 instances, maximum of 5 instances, and the desired number of instances of 4. The name of the ASG in this example is "asg-terraform-example". The ASG may be associated with a resource tag which may be assigned a value that is the same as the service ID 515 (described with FIG. 5A). In this example, the resource tag has a key of "stateful service" and a value of "12345". It may be noted that Terraform examples described herein merely intend to illustrate that the AWS resources can be described in code using IaC. The examples may not illustrate all of the possible options, arguments, and attributes, and as such, the examples may not be in proper syntax.

```
resource "aws_autoscaling_group"
name = "asg-terraform-example"
max_size = 5
min_size = 2
desired_capacity = 4
tag {    key = "stateful service"
         value = "12345" }
```

The resource keyword for an instance resource is "aws_instance". Following is an example of using Terraform to generate definition for an instance resource 593 using the resource keyword "aws_instance". In this example, the AMI used to create the instance is "data.aws_ami.ubuntu.id" and the instance type is "t2.micro" which is a low cost general purpose instance. The definition of an instance is associated with the definition of block devices where a persistent block device is set using the attribute "delete_on_termination", as described with FIG. 4B.

```
resource "aws_instance" "web" {
  ami          = "${data.aws_ami.ubuntu.id}"
  instance_type = "t2.micro" }
```

The resource keyword for a volume resource (e.g., EBS volume) is "aws_ebs_volume". Following is an example of using Terraform to generate definition for a volume resource 591 using the "aws_ebs_volume" resource keyword. In this example, the volume name is "aws_volume_example", and the volume is in the availability zone "us-west-2a" with a size of 40 GB. Instead of the size argument, a snap-shot ID argument may be specified if a snapshot is available to restore to the volume. The resource tag of the "aws_ebs_volume" resource may be assigned a value similar to the service ID 515 (described with FIG. 5A). In this example, the resource tag has a key of "stateful service" and a value of "12345".

```
resource "aws_ebs_volume" "example" {
  availability_zone = "us-west-2a"
  size              = 40
  tag {   key = "stateful service"
          value = "12345" }
```

The resource keyword for an auto-scaling group launch configuration is "aws_launch_configuration". Values for different arguments may be provided for the resource keyword "aws_launch_configuration" including "user_data" 592 to enable a user to provide user data when launching an instance. For example, the user data may include the startup script 510, as described with FIG. 5B. Values may also be provided for the identifiers "root block device" and "ebs_block_device" for the volumes to be attached to the instance, as described with FIG. 4A and FIG. 4B. Following is an example of using Terraform to define a launch configuration resource using the resource keyword "aws_launch_configuration". The name of the launch configuration is "aws_launch_config_example". The resource keyword "aws_launch_configuration" may be used with a "user_data" argument where the startup-script 510 may be entered as the "user_data".

```
resource "aws_launch_configuration" "as_conf" {
  name = "aws_launch_config_example"
  image_id = "${data.aws_ami.ubuntu.id}" }
```

The resource keyword for an AMI (e.g., machine image 450) is "aws_ami", as described with FIG. 4A. Following is an example of using Terraform to define an AMI resource using the resource keyword "aws_ami". The name of the AMI is "ami-terraform-example". The AMI may be used to launch an instance whose root device may be backed by an EBS volume populated from a snapshot. It is assumed that such a snapshot already exists with the id of "snap_ID_example".

```
resource "aws_ami" {
  name = "ami-terraform-example"
  root_device_name = "/dev/xvda"
  ebs_block_device {
    device_name = "/dev/xvda"
    snapshot_id = "snap_ID_example"
    volume_size = 8 } }
```

Once the resources of the stateful service 301 are configured using IaC, and a configuration file is generated, the configuration file may be ready for execution to create the corresponding infrastructure. Execution of the configuration may cause an auto-scaling group to be formed, instances to be launched, and persistent volumes to be generated or resurrected and attached to the instance. For some embodiments, a scheduler may be used to schedule the IaC configuration as a job for execution. One example of a scheduler is Nomad by HashiCorp. Nomad helps creating a unified interface for developers to run any application on any infrastructure. For example, Nomad includes a raw_exec driver that can be used to execute a command that is a binary file.

It may be noted that the above description is not modeled around containers. A container is a standard unit of software that packages up code and all its dependencies so the application runs quickly and reliably from one computing environment to another. The applications in multiple containers share an OS system kernel at the machine level and therefore do not require an OS per application. Generally, containers are stateless. They don't have persistent data, and they can't maintain data when they're either moved to another node or the container is destroyed. Kubernetes, developed by Cloud Native Computing Foundation, is an open-source container-orchestration system for automating application deployment, scaling, and management. Kubernetes has a lot of features and deployment options for running containers, including a feature named statefulset to support persistent disk storage and stateful applications. However, the use of statefulset is modelled around containers, which is different from using the IaC 580 and the startup script 510.

Referring back to FIG. 4A, a user has the option to select the machine image 450 when configuring an instance. For example, using the AWS infrastructure, a user can select an AMI that is from an AWS marketplace, community AMIs, or the user's own AMI. Each of the available AMIs may be based on an operating system such as, for example, Amazon Linux, Ubuntu, Windows, etc. As described with FIG. 4A, the user's own AMI may be created based on a running instance or a stopped instance.

It may be possible that, while the stateful service 301 is running using an existing machine image 450, there is a need to update the machine image 450. For example, the update may be related to a security patch. The update may be related to patching the OS. The update to the machine image 450 may result in an updated machine image. For example, the updated machine image may be generated using an application named "Packer" of HashiCorp. Packer can be used to generate machine images for many infrastructure including the AWS infrastructure. Packer includes an machine image builder that generates an EBS-backed AMI by launching a source AMI, provisioning on top of that, and re-packaging it into a new or updated AMI. For some embodiments, the generation of the updated machine image may be performed periodically. For example, the operation may be performed one or more times a day.

The updated machine image (or updated AMI) may be assigned a unique machine image ID. The updated machine image may need to be registered with the AWS infrastructure to be available for selection by the ASG 305 to launch an instance. For example, the machine image ID of the updated machine image may be specified in the launch configuration associated with the ASG 305 so that the updated machine image may be used when a next instance is launched.

It is possible that the updated machine image is generated after the stateful service 301 is already running with active instances. A user may manually terminate each of the active instances and re-launching them so all of the instances will be running with the updated machine image. However, this manual approach is not ideal because it may cause service disruption to the stateful service 301.

For some embodiments, the updating of the instances to use the updated machine image may be performed automatically based on the operation of the ASG. This is because the ASG at some point will perform a scaling up or scaling down operation and the updated machine image may be automatically selected when a new instance is launched. Using the ASG to update the instances with the updated machine image may result in the stateful service 301 having some instances running with an outdated machine image and some instances running with an updated machine image for a certain time period. However, eventually as more scaling operations are performed by the ASG 305, all of the instances will be running with the updated machine image. It is possible that this approach may take a while for all of the instances to be running with the updated machine image if the stateful service 301 does not require the ASG 305 to perform many scaling operations.

For some embodiments, the updating of an instance to use an updated machine image may be performed by periodically terminating an oldest active instance in the ASG 305. For example, the termination of the oldest active instance may be performed once a day or more. Determining an oldest active instance may be based on a timestamp associated with each instance. Terminating an oldest instance and launching a new instance in its place enables the updated machine image to be applied to the new instance. This periodic termination approach may eventually enable the updated machine image to be reflected in all of the active instances. One advantage to this approach is that the time to get all of the instances to run with the updated machine image may be more definite. Another advantage of this approach is the delay between the periodic terminations of the oldest instances may allow for time to discover whether the update machine image performs as intended.

Figure 6:
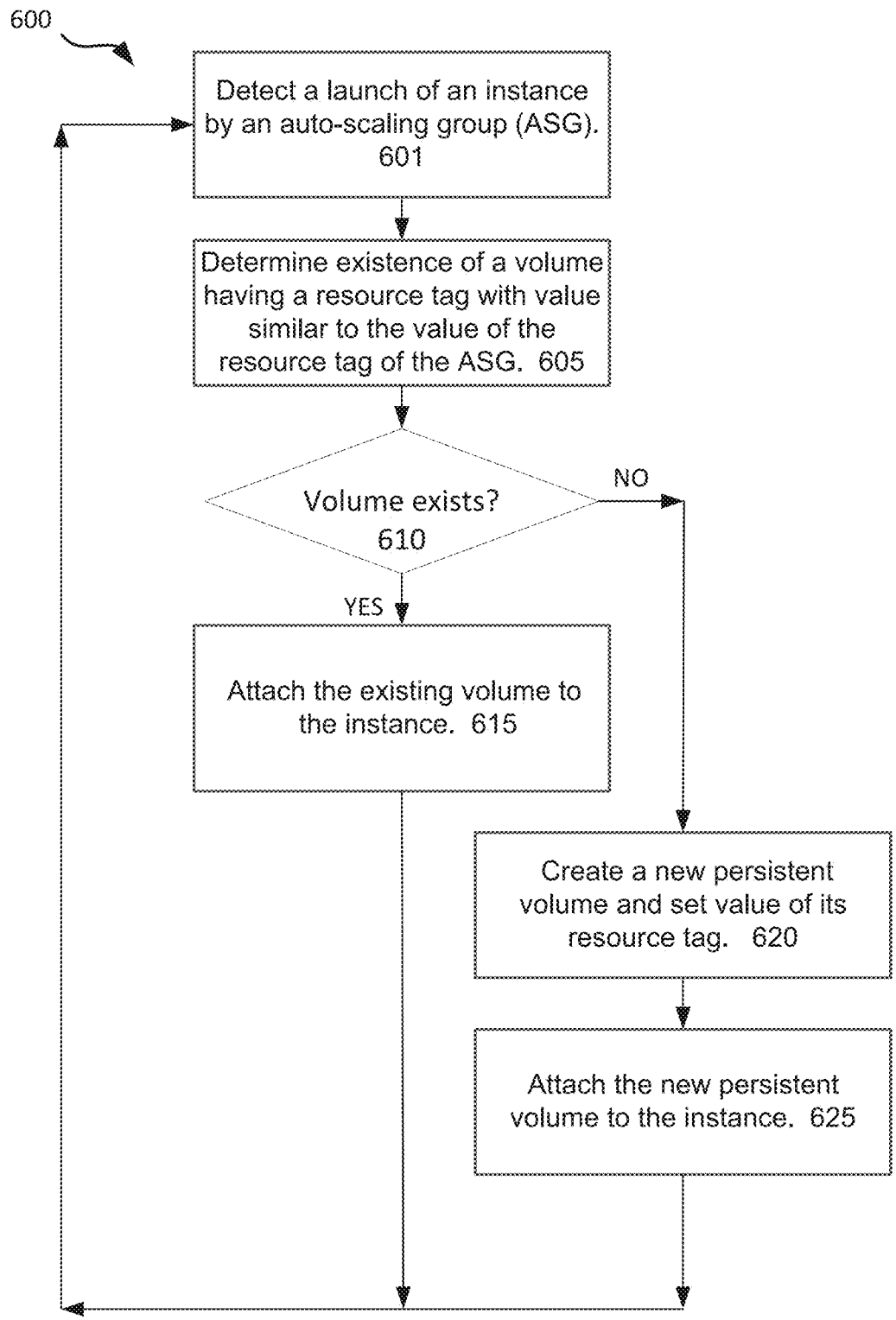
FIG. 6 is an example flow diagram of a process that may be used to configure a stateful application, in accordance with some embodiments.

FIG. 6 is an example flow diagram of a process that may be used to configure a stateful application, in accordance with some embodiments. The process shown in diagram 600 may be performed by a startup script 510, as described with FIG. 5A. The startup script may be associated with an ASG and a stateful service. The ASG may have been defined to include a resource tag with a value similar to a service ID of the stateful service.

At block 601, the startup script may detect a launch of an instance by an auto-scaling group (ASG). At blocks 605 and 610, the startup script may determine if there is an existing volume having a resource tag with a value similar to the value of the resource tag associated with the ASG.

If the determination of an existing volume that has a resource tag with a value similar to the value of the resource tag of the ASG is successful, then the existing volume is attached to the instance, as shown in block 615. Alternatively, if the determination fails because there is no existing volume that satisfies the above condition, it may be possible that the volume does not exist. In that situation, the startup script may be configured to generate a new volume, assign to its resource tag a value similar to the value of the resource tag associated with the ASG, as shown in block 620. At block 625, the new volume is attached to the instance. It may be possible that there is an existing volume, but for some reasons, that volume may not have a resource tag, or if it has a resource tag, its value may be different from the value of the resource tag associated with the ASG. The process may continue with the ASG terminating or launching instances. When there is a scaling down, an instance may be terminated and the content of the volumes attached to that instance may remain the same and not wiped out. When there is a scaling up, the startup script may continue with the operation shown at block 601.

Figure 7:
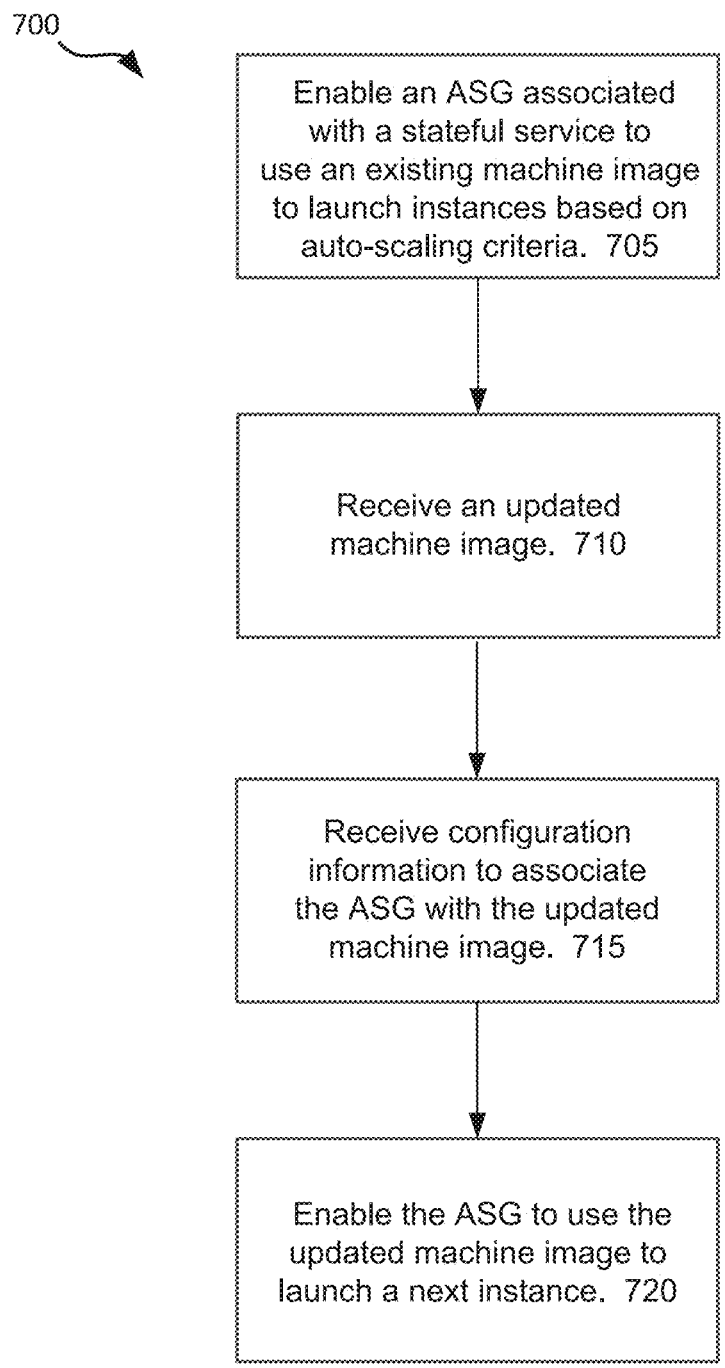
FIG. 7 is an example flow diagram of a process that may be used to apply an updated machine image, in accordance with some embodiments.

FIG. 7A is an example flow diagram of a process that may be used to apply an updated machine image, in accordance with some embodiments. The process shown in diagram 700 may be associated with a stateful service described with FIGS. 3-6. The stateful service may be associated with an ASG. The process assumes that there is an existing machine image, and that existing machine image may be accessible to create an updated machine image.

At block 705, the stateful service may be started, and the ASG associated with the stateful service may be configured to use an existing machine image to launch instances based on auto-scaling criteria. At block 710, an updated machine image may be received. The updated machine image may have been generated based on the existing machine image. For example, the updated machine image may include a patched OS. The updated machine image may have been registered with the infrastructure (e.g., AWS infrastructure) while the stateful service is already running. At block 715, a configuration may be received to associate the updated machine image with the ASG. At block 720, the ASG may be configured to use the updated machine image when it launches a next instance. Using the ASG to gradually apply the updated machine image with the new instances is advantageous because it allows the process to be performed automatically instead of manually. In addition, the combination of having a new instance launched with the updated machine image by the ASG and being able to locate the existing persistent volumes using their resource tags may enable the update to be performed with minimal disruption to the stateful service 301.

Figure 8A:
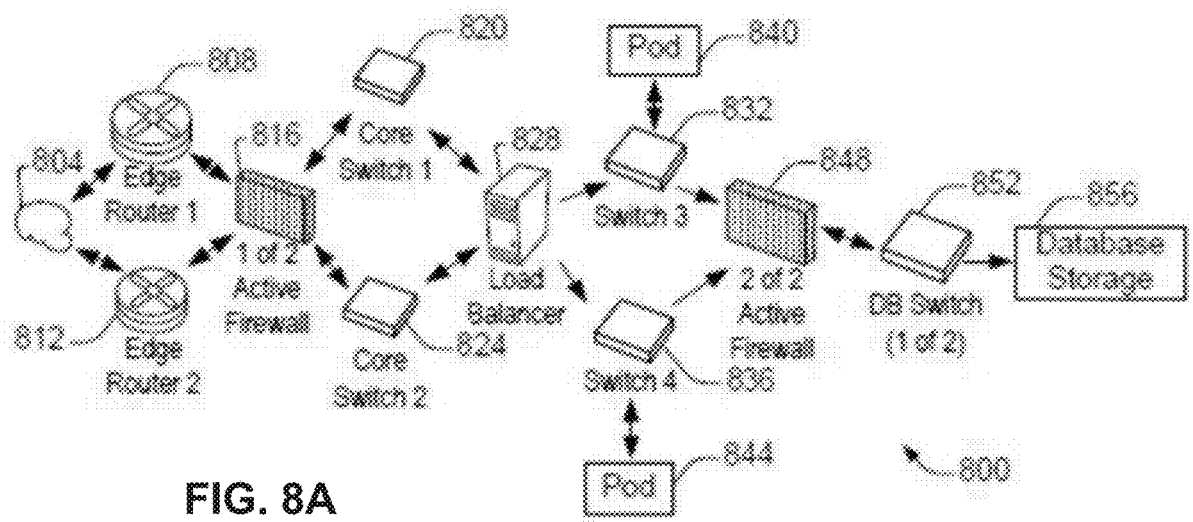
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
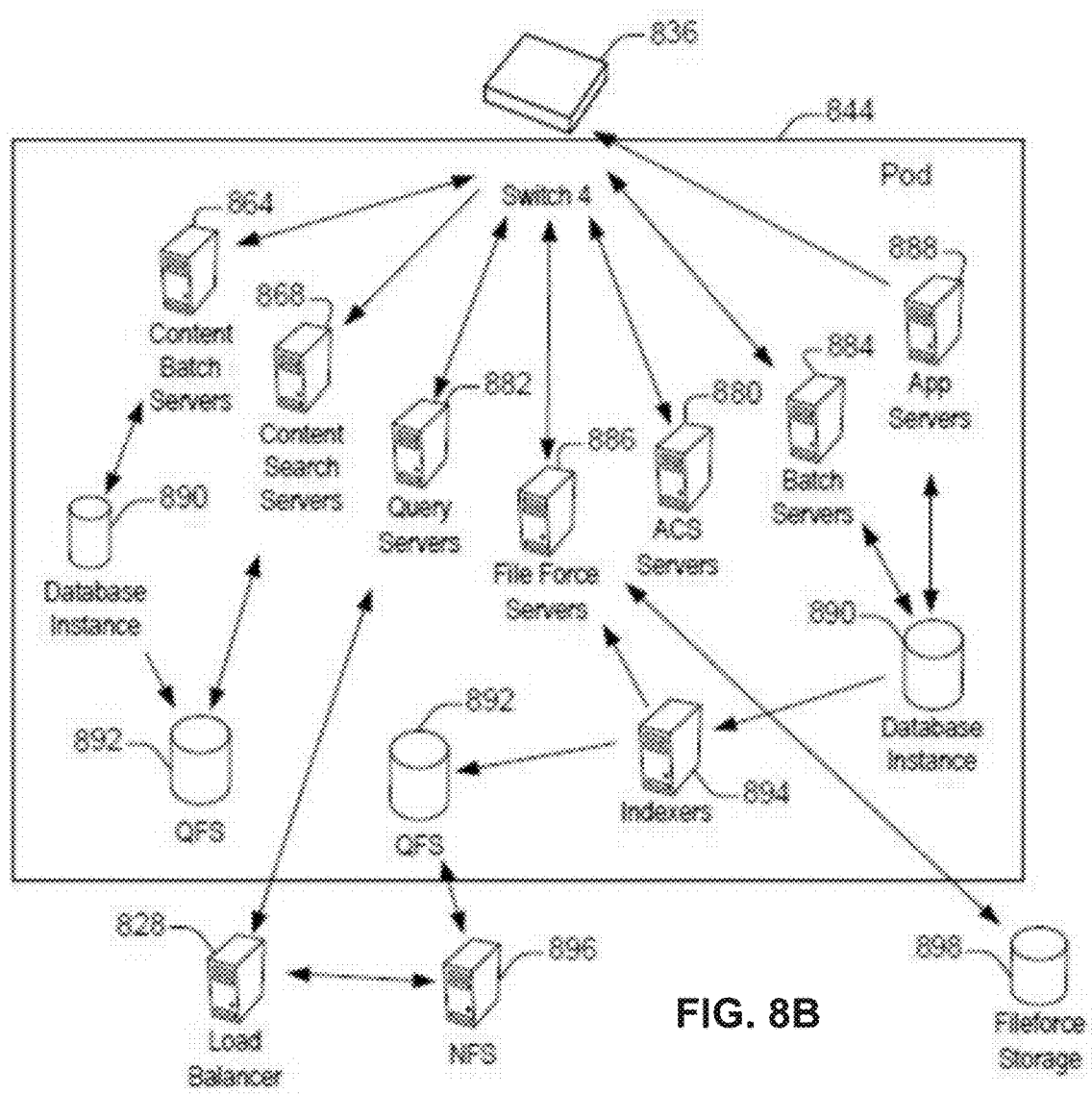
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to Fileforce servers 886 and/or the QFS 892.

Figure 9:
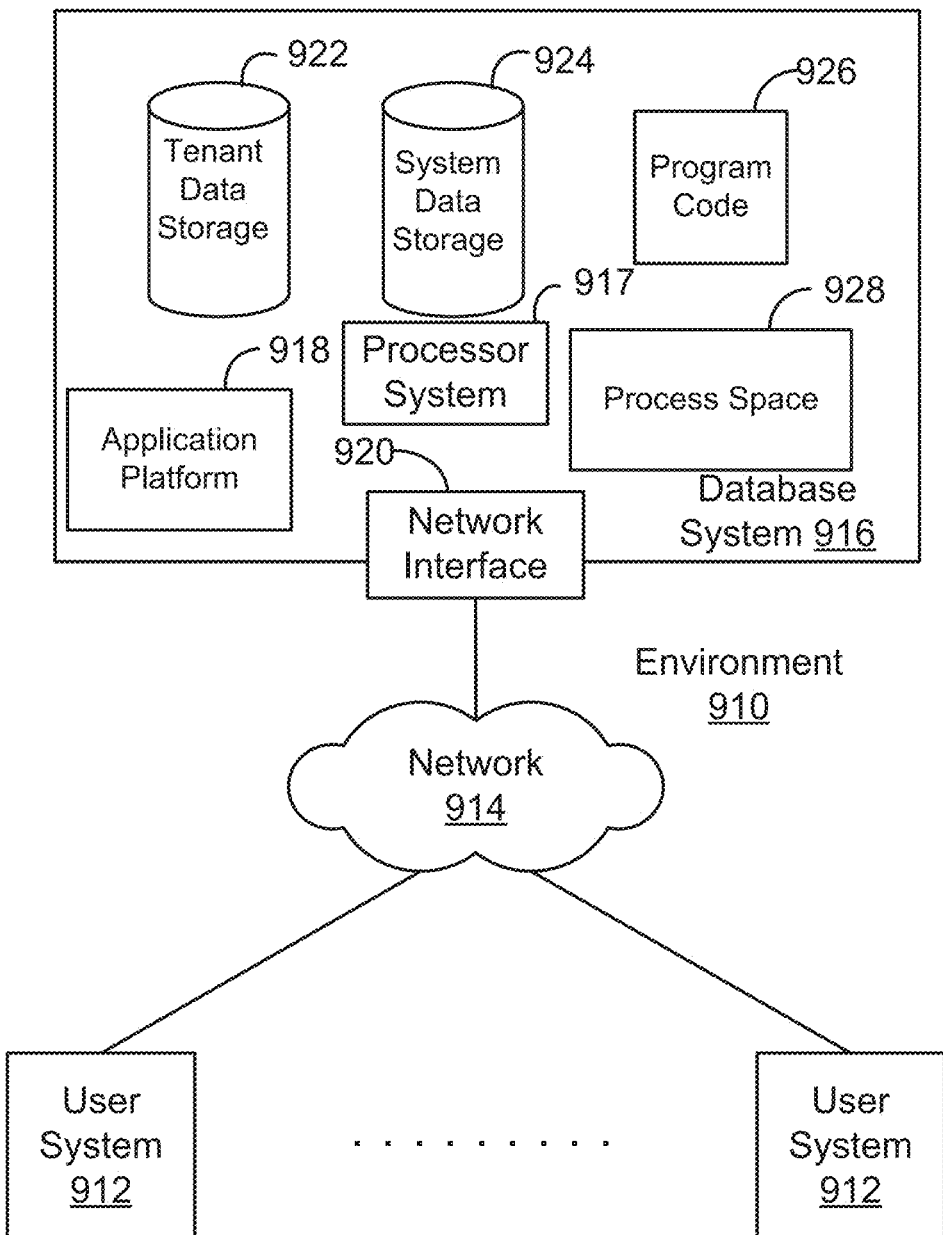
FIG. 9 shows a system diagram illustrating the architecture of a multi-tenant database environment, in accordance with some embodiments.
Figure 10:
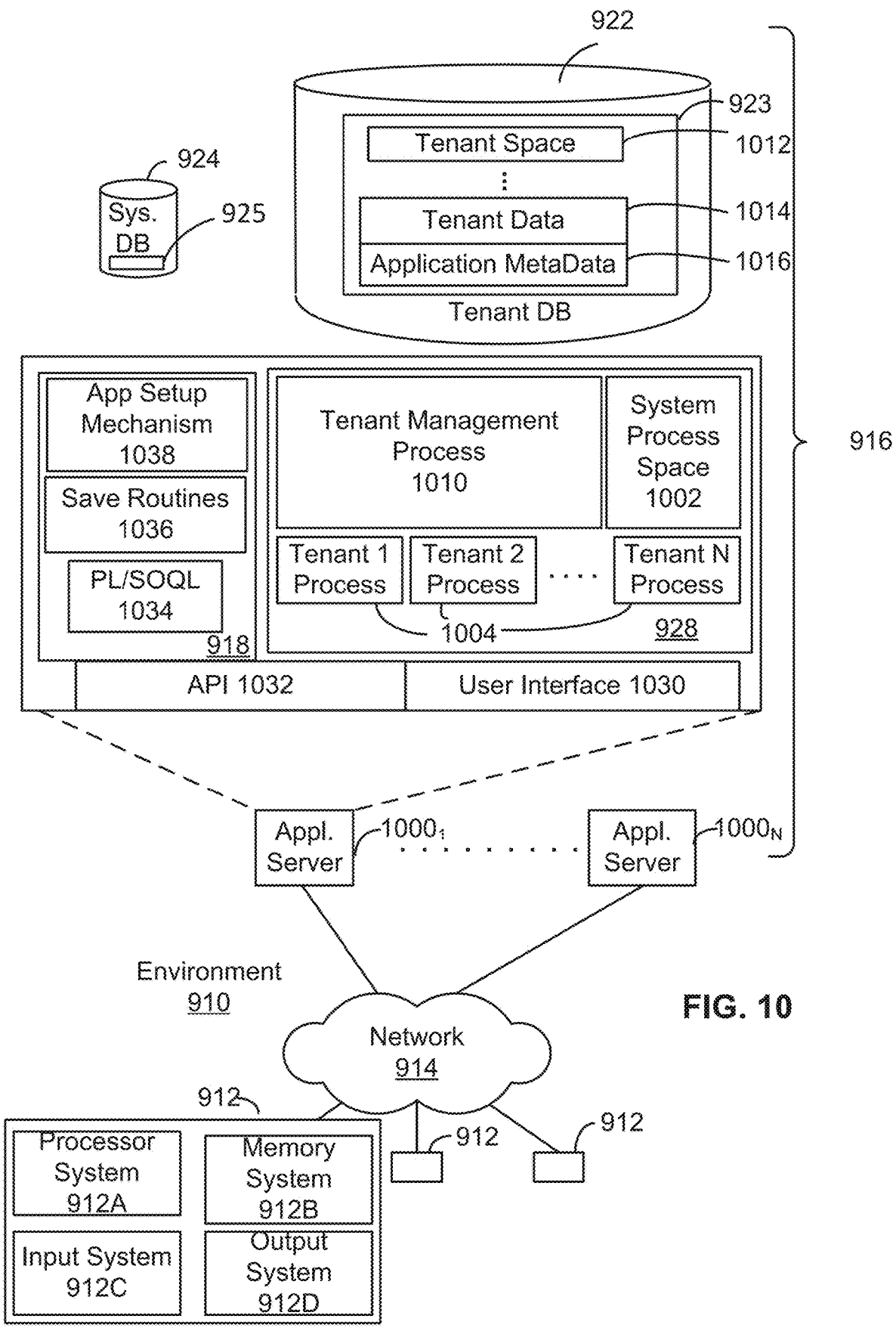
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should be also understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N−1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method for implementing stateful services using cloud-based resources comprising:
   determining, by a server computing system, whether a first volume having a resource tag with a value that corresponds to a value of a resource tag of an auto-scaling group (ASG) exists in response to a launch of a first instance by the ASG, the ASG being configured to launch the first instance automatically based on a scaling policy, and wherein the first volume was previously attached to a second instance terminated by the ASG;
   based on a successful determination of the existence of the first volume, attaching, by the server computing system, the first volume to the first instance launched by the ASG; and based on a failed determination of the existence of the first volume:
  generating, by the server computing system, a second volume,
  attaching, by the server computing system, the second volume to the first instance, and
  setting a resource tag of the second volume to a value corresponding to the value of the resource tag of the ASG.

2. The method of claim 1, wherein the ASG, the first instance, the second instance, the first volume and the second volume are defined using infrastructure as code (IaC).

3. The method of claim 2, wherein the first volume and the second volume are defined as persistent volumes using the IaC.

4. The method of claim 3, wherein the value of the resource tag of the ASG is associated with a value assigned to the stateful service.

5. The method of claim 4, wherein instances launched by the ASG, including the first instance and the second instance, are configured to be in an availability zone.

6. The method of claim 5, further comprising setting, by the server computing system, the resource tag of the first volume to a value corresponding to the value of the resource tag of the ASG when the first volume was attached to the second instance.

7. The method of claim 6, wherein said launching of the first instance and said termination of the second instance are performed by the ASG based on scaling criteria defined using the IaC.

8. A system for implementing stateful services using cloud-based resources comprising:
  one or more processors; and
  a non-transitory computer readable medium storing a plurality of instructions, which when executed, cause the one or more processors of a server computing system to:
    determine whether a first volume having a resource tag with a value that corresponds to a value of a resource tag of an auto-scaling group (ASG) exists in response to a launch of a first instance by the ASG, the ASG being configured to launch the first instance automatically based on a scaling policy, and wherein the first volume was previously attached to a second instance terminated by the ASG;
    based on a successful determination of the existence of the first volume, attach the first volume to the first instance launched by the ASG; and
    based on a failed determination of the existence of the first volume:
      generate a second volume,
      attach the second volume to the first instance, and
      set a resource tag of the second volume to a value corresponding to the value of the resource tag of the ASG.

9. The system of claim 8, wherein the ASG, the first instance, the second instance, the first volume and the second volume are defined using infrastructure as code (IaC).

10. The system of claim 9, wherein the first volume and the second volume are defined as persistent volumes using the IaC.

11. The system of claim 10, wherein the value of the resource tag of the ASG is associated with a value assigned to the stateful service.

12. The system of claim 11, wherein instances launched by the ASG, including the first instance and the second instance, are configured to be in an availability zone.

13. The system of claim 12, further comprising instructions to set the resource tag of the first volume to a value corresponding to the value of the resource tag of the ASG when the first volume was attached to the second instance.

14. The system of claim 13, wherein the ASG is configured to launch the first instance and to terminate the second instance based on scaling criteria defined using the IaC.

15. A computer program product for implementing stateful services using cloud-based resources comprising computer-readable program code to be executed by one or more processors when retrieved from a non-transitory computer-readable medium, the program code including instructions to:
  determine whether a first volume having a resource tag with a value that corresponds to a value of a resource tag of an auto-scaling group (ASG) exists in response to a launch of a first instance by the ASG, the ASG being configured to launch the first instance automatically based on a scaling policy, and wherein the first volume was previously attached to a second instance terminated by the ASG;
  based on a successful determination of the existence of the first volume, attach the first volume to the first instance launched by the ASG; and
  based on a failed determination of the existence of the first volume:
    generate a second volume,
    attach the second volume to the first instance, and
    set a resource tag of the second volume to a value corresponding to the value of the resource tag of the ASG.

16. The computer program product of claim 15, wherein the ASG, the first instance, the second instance, the first volume and the second volume are defined using infrastructure as code (IaC).

17. The computer program product of claim 16, wherein the first volume and the second volume are defined as persistent volumes using the IaC.

18. The computer program product of claim 17, wherein the value of the resource tag of the ASG is associated with a value assigned to the stateful service.

19. The computer program product of claim 18, wherein instances launched by the ASG, including the first instance and the second instance, are configured to be in a same availability zone.

20. The computer program product of claim 19, further comprising instructions to set the resource tag of the first volume to a value that is the same as the value of the resource tag of the ASG when the first volume was attached to the second instance.

21. The computer program product of claim 20, wherein the ASG is configured to launch the first instance and to terminate the second instance based on scaling criteria defined using the IaC.

* * * * *